(12) United States Patent
Li

(10) Patent No.: US 10,048,730 B2
(45) Date of Patent: Aug. 14, 2018

(54) SYSTEMS AND METHODS FOR RECTIFYING A VOLTAGE USING AN EMBEDDED DIRECT-CURRENT-TO-DIRECT-CURRENT CONVERTER

(71) Applicant: Dell Products L.P., Round Rock, TX (US)

(72) Inventor: Hongping Li, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 275 days.

(21) Appl. No.: 14/281,045

(22) Filed: May 19, 2014

(65) Prior Publication Data

US 2015/0333616 A1 Nov. 19, 2015

(51) Int. Cl.
| | | |
|---|---|---|
| *H02M 1/14* | (2006.01) | |
| *G06F 1/26* | (2006.01) | |
| *H02M 1/15* | (2006.01) | |
| *H02M 1/42* | (2007.01) | |
| *H02M 1/00* | (2006.01) | |

(52) U.S. Cl.
CPC ............... *G06F 1/26* (2013.01); *H02M 1/14* (2013.01); *H02M 1/143* (2013.01); *H02M 1/15* (2013.01); *H02M 1/4208* (2013.01); *H02M 2001/007* (2013.01); *Y02B 70/126* (2013.01)

(58) Field of Classification Search
CPC ................................. H02M 1/143; H02M 1/14
USPC .......................................................... 363/52
See application file for complete search history.

(56) References Cited

U.S. PATENT DOCUMENTS

| | | | | |
|---|---|---|---|---|
| 5,283,726 A | * | 2/1994 | Wilkerson | .......... H02M 1/4233 323/207 |
| 2007/0076445 A1 | * | 4/2007 | Boke; Ulrich | ...... H02M 3/3376 363/17 |
| 2008/0002444 A1 | * | 1/2008 | Shekhawat | ............. H02M 1/34 363/127 |
| 2008/0198638 A1 | * | 8/2008 | Reinberger | ......... H02M 3/3376 363/74 |
| 2010/0156309 A1 | * | 6/2010 | Liu | ..................... H05B 33/0893 315/246 |
| 2011/0216560 A1 | * | 9/2011 | Ye | ......................... H02M 3/335 363/21.15 |
| 2012/0051097 A1 | * | 3/2012 | Zhang | ................. H02M 1/4225 363/21.07 |
| 2014/0043866 A1 | * | 2/2014 | Zhao | ................. H02M 3/33507 363/21.12 |
| 2014/0049104 A1 | * | 2/2014 | Hagihara | ................ H02J 9/062 307/23 |

(Continued)

*Primary Examiner* — Jue Zhang
*Assistant Examiner* — Trinh Q Dang
(74) *Attorney, Agent, or Firm* — Jackson Walker L.L.P.

(57) ABSTRACT

In accordance with embodiments of the present disclosure, a voltage rectifier may include: an AC/DC converter, a first DC/DC converter, and a second DC/DC converter. The AC/DC converter may be configured to convert an AC source voltage to a DC bus voltage. The first DC/DC converter may be configured to convert the bus voltage to a DC compensating voltage having an AC ripple to compensate for AC ripple of the bus voltage. The second DC/DC converter may be configured to convert a DC compensated bus voltage to a DC output voltage, wherein the DC compensated bus voltage is equal to a difference between the bus voltage and the compensating voltage.

13 Claims, 3 Drawing Sheets

(56) References Cited

U.S. PATENT DOCUMENTS

2014/0160805 A1* 6/2014 Oh .................... H02M 3/33507
363/21.02
2015/0092458 A1* 4/2015 Levy ................. H02M 3/33507
363/21.12

* cited by examiner

SYSTEMS AND METHODS FOR RECTIFYING A VOLTAGE USING AN EMBEDDED DIRECT-CURRENT-TO-DIRECT-CURRENT CONVERTER

TECHNICAL FIELD

The present disclosure relates in general to information handling systems, and more particularly to managing a voltage regulator in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a power system including a rectifier for converting an alternating current (AC) voltage (e.g., as available from a public power grid) to a direct current (DC) voltage suitable for use by components of the information handling system. An example of such a rectifier, as is known in the art, is shown in FIG. 1. As shown in FIG. 1, a rectifier 100 may include two converter stages, a power factor correcting (PFC) AC/DC converter stage 102 and a DC/DC converter stage 104. PFC AC/DC converter stage 102 may have an associated PFC controller 106 configured to, based on an input current $i_{in}$, a sinusoidal source voltage $v_{in}$, and a bus voltage $V_{bus}$, shape the input current $i_{in}$ to have a sinusoidal waveform in-phase with the source voltage $v_{in}$ and to generate regulated DC bus voltage $V_{bus}$ on bulk capacitor 108. In some embodiments, PFC AC/DC converter stage 102 may be implemented as an AC/DC converter using a boost converter topology. In turn, DC/DC converter stage 104 may convert bus voltage $V_{bus}$ to a DC output voltage $V_{out}$ under the control of a DC/DC controller 110 that controls DC/DC converter stage 104 based on output voltage $V_{out}$ in order to maintain a regulated output voltage $V_{out}$.

The rectifier architecture of FIG. 1 may suffer from numerous disadvantages. First, the architecture often requires very high voltages (e.g., 380 volts or more) in order to realize power factor correction using boost type topologies. However, such high voltage renders it difficult to construct rectifiers having high energy efficiency.

Second, the architecture of rectifier 100 often operates with a dynamic imbalance of power between power Pin(t) delivered from PFC AC/DC converter stage 102 and power $P_o$ delivered to DC/DC converter stage 104. To illustrate, power Pin(t)=$V_n \times I_n \times (1-\cos 2\omega t)/2$, where $V_n$ is the peak voltage of input voltage $V_{in}$, $I_n$ is the peak current of input current $i_{in}$, and ω is the angular frequency of input voltage $v_{in}$. On the other hand, power $P_o$ is a constant, and capacitor 108 accommodates the power imbalance.

Third, because of this power imbalance, bus voltage $V_{bus}$ may include an AC ripple voltage superimposed on its DC voltage $v_{dc}$ as shown in FIG. 3. In rectifier 100, the bus voltage $V_{bus}$ may be given by the equation $V_{bus}(t)=v_{dc}-P_o \times \sin 2\omega t/(4\omega \times C_{bulk} \times v_{dc})$, where $C_{bulk}$ is the capacitance of capacitor 109.

SUMMARY

In accordance with the teachings of the present disclosure, the disadvantages and problems associated with traditional voltage rectifiers may be reduced or eliminated.

In accordance with embodiments of the present disclosure, a voltage rectifier may include: an AC/DC converter, a first DC/DC converter, and a second DC/DC converter. The AC/DC converter may be configured to convert an AC source voltage to a DC bus voltage. The first DC/DC converter may be configured to convert the bus voltage to a DC compensating voltage having an AC ripple to compensate for AC ripple of the bus voltage. The second DC/DC converter may be configured to convert a DC compensated bus voltage to a DC output voltage, wherein the DC compensated bus voltage is equal to a difference between the bus voltage and the compensating voltage.

In accordance with these and other embodiments of the present disclosure, an information handling system may include at least one information handling resource and a power system configured to deliver electrical energy to the at least one information handling resource. The power system may have a rectifier comprising an AC/DC converter, a first DC/DC converter, and a second DC/DC converter. The AC/DC converter may be configured to convert an AC source voltage to a DC bus voltage. The first DC/DC converter may be configured to convert the bus voltage to a DC compensating voltage having an AC ripple to compensate for AC ripple of the bus voltage. The second DC/DC converter may be configured to convert a DC compensated bus voltage to a DC output voltage, wherein the DC compensated bus voltage is equal to a difference between the bus voltage and the compensating voltage.

In accordance with these and other embodiments of the present disclosure, a method may include converting an AC source voltage to a DC bus voltage. The method may also include converting the bus voltage to a DC compensating voltage having an AC ripple to compensate for AC ripple of the bus voltage. The method may further include converting a DC compensated bus voltage to a DC output voltage, wherein the DC compensated bus voltage is equal to a difference between the bus voltage and the compensating voltage.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-6, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

Figure 1:
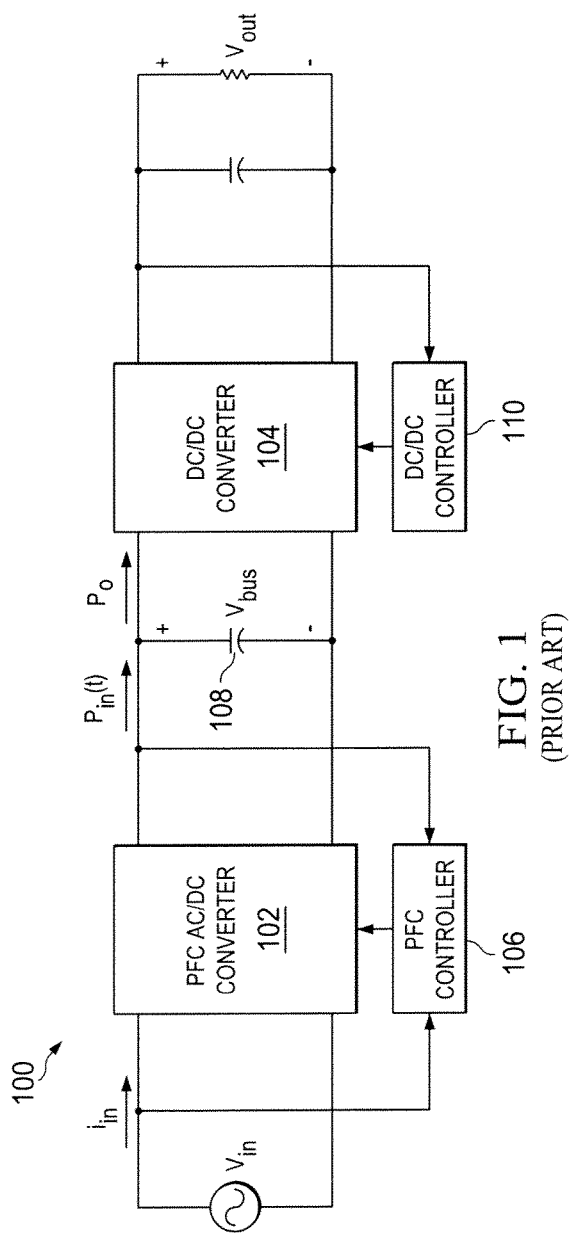
FIG. 1 illustrates a block diagram of an example rectifier circuit, as is known in the art.
Figure 2:
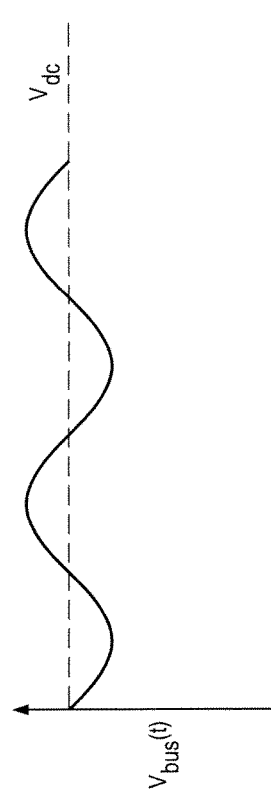
FIG. 2 illustrates a graph depicting an example bus voltage versus time for the rectifier illustrated in FIG. 1, as is known in the art.
Figure 3:
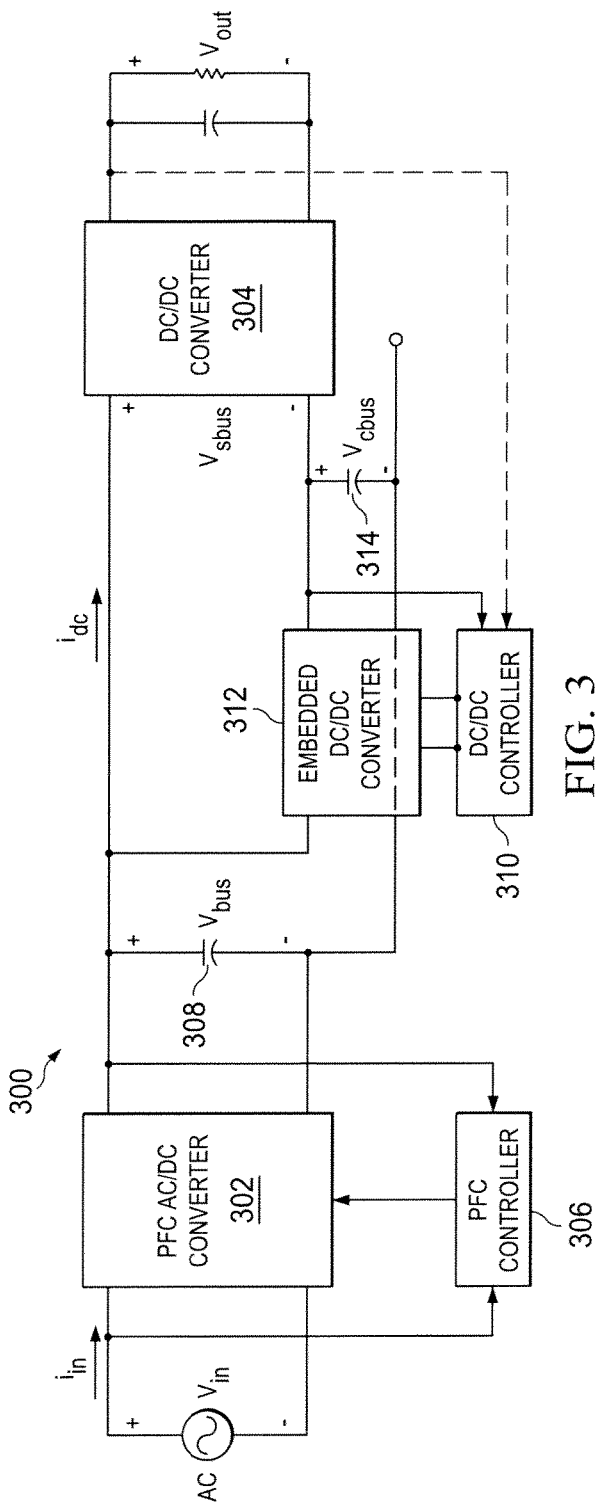
FIG. 3 illustrates a block diagram of an example rectifier circuit including an embedded DC/DC converter, in accordance with embodiments of the present disclosure.
Figure 5B:
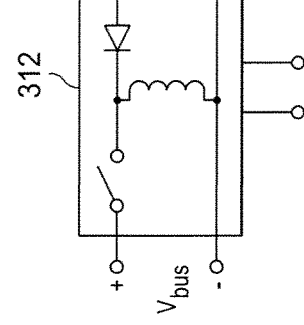
FIGS. 5A and 5B each illustrate example embodiments of the embedded DC/DC converter depicted in FIG. 3, in accordance with embodiments of the present disclosure.
Figure 5A:
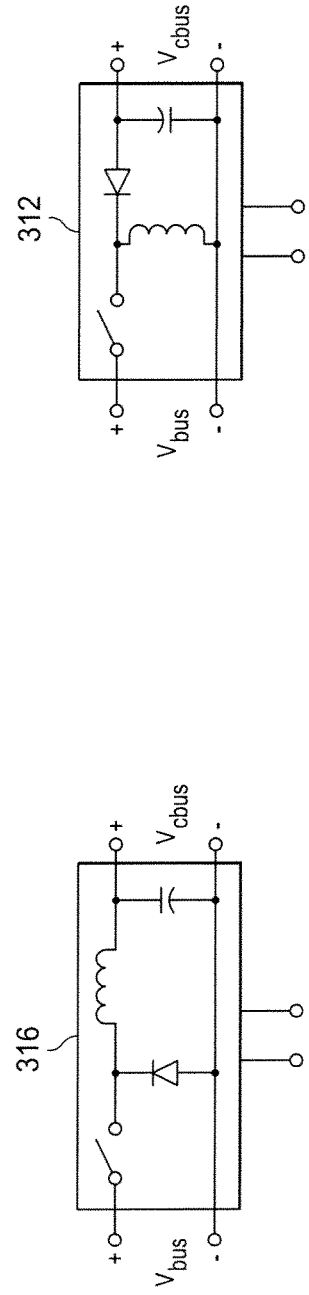

FIG. 3 illustrates a block diagram of an example rectifier 300 including an embedded DC/DC converter 312, in accordance with embodiments of the present disclosure. As shown in FIG. 3, rectifier 300 may include two converter stages: a power factor correcting (PFC) AC/DC converter stage 302 and a DC/DC converter stage 304. In addition, rectifier 300 may include an embedded DC/DC converter 312.

Figure 4:
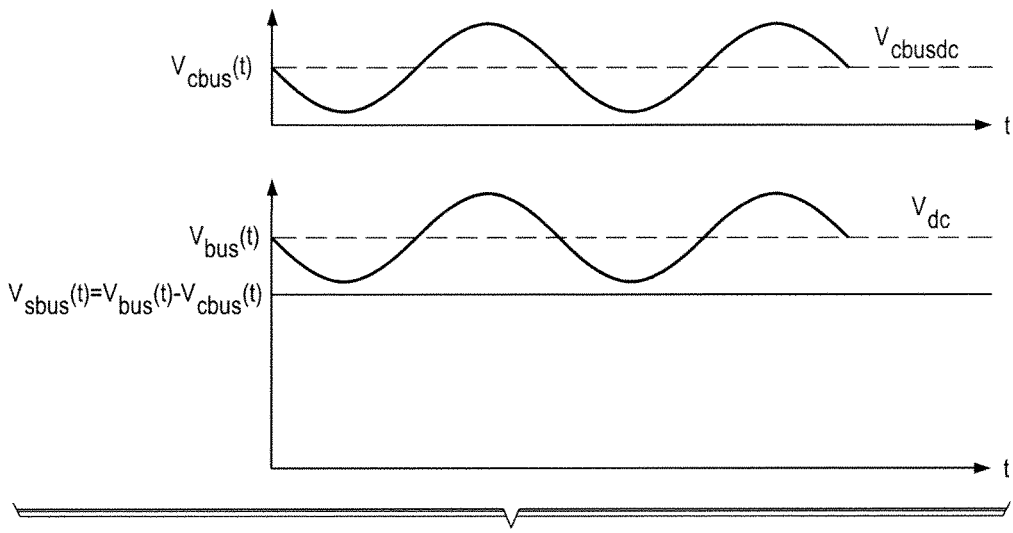
FIG. 4 illustrates a graph depicting various example voltages versus time for the rectifier illustrated in FIG. 3, in accordance with embodiments of the present disclosure.

PFC AC/DC converter stage 302 may have an associated PFC controller 306 configured to, based on an input current $i_{in}$, a sinusoidal source voltage $v_{in}$, and a bus voltage $V_{bus}$, shape the input current $i_{in}$ to have a sinusoidal waveform in-phase with the source voltage $v_{in}$ and to generate regulated DC bus voltage $V_{bus}$ on bulk capacitor 308. In some embodiments, PFC AC/DC converter stage 302 may be implemented as an AC/DC converter using a boost converter topology. An example waveform for the bus voltage $v_{bus}$ as a function of time, $v_{bus}(t)$, is depicted in FIG. 4.

Embedded DC/DC converter 312 may include any suitable system, device, or apparatus for converting bus voltage $v_{bus}$ to a compensating voltage $v_{cbus}$ output to a bulk capacitor 314. In some embodiments, a DC/DC controller 310 may control embedded DC/DC converter 312 based on an output voltage $v_{out}$ in order to maintain an AC ripple-dominated DC compensating voltage $v_{cbus}$. In these and other embodiments, DC/DC controller 310 may control embedded DC/DC converter 312 based on an output voltage $v_{out}$ in order to regulate compensating voltage $v_{cbus}$. The AC ripple of the compensating voltage $v_{cbus}$ may cancel the AC ripple of the bus voltage $v_{bus}$, and the compensating voltage $v_{cbus}$ may be subtracted from the bus voltage $v_{bus}$ in order to generate compensated bus voltage $v_{sbus}$. An example waveform for the compensating voltage $v_{cbus}$ as a function of time, $v_{cbus}(t)$, and the compensated bus voltage $v_{sbus}$ as a function of time, $v_{sbus}(t)$, are depicted in FIG. 4. As shown in FIG. 4, compensated bus voltage $v_{sbus}$ may be a highly-regulated voltage waveform, substantially free from AC ripple. In addition, the magnitude of compensated bus voltage $v_{sbus}$ may be controlled by varying a DC component $V_{cbusdc}$ of compensating voltage $v_{cbus}$, meaning compensated bus voltage $v_{sbus}$ may have a wide range, as compared to the range of voltages typically input to a DC/DC converter stage in existing rectifier topologies.

Embedded DC/DC converter 312 may be implemented using any system, device, or apparatus suitable to convert DC bus voltage $v_{bus}$ to DC compensating voltage $v_{cbus}$. The power conversion ratio of embedded DC/DC converter 312 may be relatively small, meaning embedded DC/DC converter 312 may be implemented with a relatively small converter. For example, in some embodiments, embedded DC/DC converter 312 may comprise a buck-type DC/DC converter, such as that depicted in FIG. 5A. In other embodiments, embedded DC/DC converter 312 may comprise a buck-boost-type DC/DC converter, such as that depicted in FIG. 5B.

DC/DC converter stage 304 may convert compensated bus voltage $V_{sbus}$ to a DC output voltage $V_{out}$. In some embodiments, DC/DC converter stage 304 may be unregulated (e.g., open loop), meaning that regulation of output voltage $V_{out}$ is not controlled by a controller for DC/DC converter 304. Because regulation of DC/DC converter stage 304 would, if such regulation is present, require considerable power consumption, rectifier 300 may operate with higher power-efficiency as compared to existing rectifier topologies. In addition, as compared to existing rectifier topologies, DC/DC converter stage 304 may receive a lower input bus voltage $V_{sbus}$, also potentially allowing rectifier 300 to operate with higher power-efficiency as compared to existing rectifier topologies. Furthermore, as compared to existing rectifier topologies, DC/DC converter stage 304 may receive a higher input bus voltage $V_{sbus}$, potentially allowing rectifier 300 to operate with a longer hold-up as compared to existing rectifier topologies.

Figure 6:
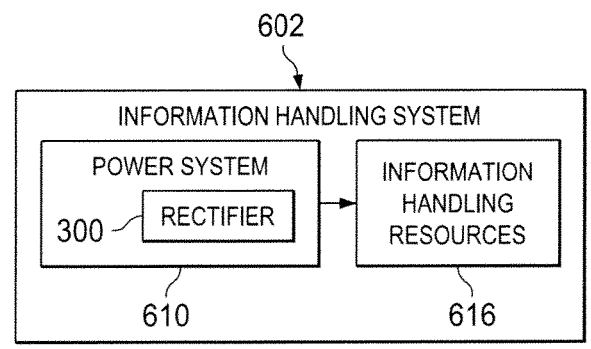
FIG. 6 illustrates a block diagram of an example information handling system, in accordance with embodiments of the present disclosure.

FIG. 6 illustrates a block diagram of an example of an information handling system 602. In some embodiments, information handling system 602 may comprise a server. In other embodiments, information handling system 602 may comprise networking equipment for facilitating communication over a communication network. In yet other embodiments, information handling system 602 may comprise a personal computer, such as a laptop, notebook, or desktop computer. In yet other embodiments, information handling system 602 may be a mobile device sized and shaped to be readily transported and carried on a person of a user of information handling system 602 (e.g., a smart phone, a tablet computing device, a handheld computing device, a personal digital assistant, etc.).

As shown in FIG. 6, information handling system 602 may include a power system 610 and one or more other information handling resources 616.

Generally speaking, power system 610 may include any system, device, or apparatus configured to supply electrical current to one or more information handling resources 616. In some embodiments, power system 610 may include rectifier 300, such as the rectifier depicted in FIG. 3.

Generally speaking, information handling resources 616 may include any component system, device or apparatus of information handling system 602, including without limitation processors, buses, computer-readable media, input-output devices and/or interfaces, storage resources, network interfaces, motherboards, electro-mechanical devices (e.g., fans), displays, and/or power supplies.

Although the present disclosure has been described in detail, it should be understood that various changes, substitutions, and alterations can be made hereto without departing from the spirit and the scope of the disclosure as defined by the appended claims.

What is claimed is:

1. A voltage rectifier including:
an alternating-current-to-direct-current (AC/DC) converter configured to convert an alternating current (AC) source voltage to a direct current (DC) bus voltage, wherein the DC bus voltage includes an AC ripple based on the AC source voltage;
a first direct-current-to-direct-current (DC/DC) converter configured to convert the DC bus voltage to a DC compensating voltage having an AC ripple configured to compensate for the AC ripple of the DC bus voltage, the voltage rectifier being configured to generate a DC compensated bus voltage that is equal to a difference between the DC bus voltage and the DC compensating voltage, wherein the DC compensated bus voltage is substantially free of AC ripple;
a second DC/DC converter configured to receive the DC bus voltage and the DC compensating voltage and convert the DC compensated bus voltage to a DC output voltage; and
a controller configured to, based on the DC bus voltage, regulate a current input to the AC/DC converter to have a sinusoidal waveform in phase with the AC source voltage.

2. The voltage rectifier of claim 1, further comprising a second controller for regulating the first DC/DC converter based on one or more of the DC compensating voltage and the DC output voltage.

3. The voltage rectifier of claim 1, wherein the first DC/DC converter comprises a buck-type DC/DC converter.

4. The voltage rectifier of claim 1, wherein the first DC/DC converter comprises a buck-boost-type DC/DC converter.

5. The voltage rectifier of claim 2, wherein the second DC/DC converter is unregulated.

6. An information handling system comprising:
at least one information handling resource; and
a power system configured to deliver electrical energy to the at least one information handling resource, the power system having a rectifier comprising:
an alternating-current-to-direct-current (AC/DC) converter configured to convert an alternating current (AC) source voltage to a direct current (DC) bus voltage, wherein the DC bus voltage includes an AC ripple based on the AC source voltage;
a first direct-current-to-direct-current (DC/DC) converter configured to convert the DC bus voltage to a DC compensating voltage having an AC ripple configured to compensate for the AC ripple of the DC bus voltage, the rectifier being configured to generate a DC compensated bus voltage that is equal to a difference between the DC bus voltage and the DC compensating voltage, wherein the DC compensated bus voltage is substantially free of AC ripple; and
a second DC/DC converter configured to receive the DC bus voltage and the DC compensating voltage and convert the DC compensated bus voltage to a DC output voltage;
wherein the information handling system further comprises a controller configured to, based on the DC bus voltage, regulate a current input to the AC/DC converter to have a sinusoidal waveform in phase with the AC source voltage.

7. The information handling system of claim 6, further comprising a second controller for regulating the first DC/DC converter based on one or more of the DC compensating voltage and the DC output voltage.

8. The information handling system of claim 6, wherein the first DC/DC converter comprises a buck-type DC/DC converter.

9. The information handling system of claim 6, wherein the first DC/DC converter comprises a buck-boost-type DC/DC converter.

10. The information handling system of claim 7, wherein the second DC/DC converter is unregulated.

11. A method comprising:
converting an alternating current (AC) source voltage to a direct current (DC) bus voltage at an alternating-current-to-direct-current (AC/DC) converter, wherein the DC bus voltage includes an AC ripple based on the AC source voltage;

converting the DC bus voltage to a DC compensating voltage having an AC ripple configured to compensate for the AC ripple of the DC bus voltage;

generating a DC compensated bus voltage that is equal to a difference between the DC bus voltage and the DC compensating voltage, wherein the DC compensated bus voltage is substantially free of AC ripple;

receiving the DC bus voltage and the DC compensating voltage at a direct-current-to-direct-current (DC/DC) converter;

converting the DC compensated bus voltage to a DC output voltage with the DC/DC converter; and based on the DC bus voltage, regulating a current input to the AC/DC converter to have a sinusoidal waveform in phase with the AC source voltage.

12. The method of claim 11, further comprising regulating a first DC/DC converter for converting the DC bus voltage to the DC compensating voltage based on one or more of the DC compensating voltage and the DC output voltage.

13. The method of claim 12, wherein a second DC/DC converter for converting the DC compensated bus voltage to the DC output voltage is unregulated.

* * * * *